8/16/83    XR    4,399,437

United States Patent [19]
Falck et al.

[11] 4,399,437
[45] Aug. 16, 1983

[54] CODED INFORMATION ARRANGEMENT

[75] Inventors: John B. Falck, London; David Robson, Great Barton, both of England

[73] Assignee: Tag Radionics Limited, Rochford, England

[21] Appl. No.: 265,324

[22] Filed: May 19, 1981

[30] Foreign Application Priority Data

May 19, 1980 [GB] United Kingdom ............... 8016458

[51] Int. Cl.³ ..................... H04Q 9/00; G06K 19/00
[52] U.S. Cl. ............................... 340/825.54; 235/380; 340/825.72
[58] Field of Search ................. 340/825.54, 825.72; 235/488, 487, 382, 375, 380

[56] References Cited

U.S. PATENT DOCUMENTS 3,766,523 10/1973 Brocker et al. .
3,842,246 10/1974 Kohler et al. ............... 235/488
3,859,624 1/1975 Kriofsky et al. .
4,236,068 11/1980 Walton ........................ 235/380
4,277,837 7/1981 Stuckert ....................... 235/380
4,298,793 11/1981 Melis et al. ................... 235/487

FOREIGN PATENT DOCUMENTS 2747380 4/1978 Fed. Rep. of Germany .
766264 10/1976 South Africa .
1282620 7/1972 United Kingdom .
1337189 11/1973 United Kingdom .
1427920 3/1976 United Kingdom .
1488850 10/1977 United Kingdom .
1505093 3/1978 United Kingdom .
1507050 4/1978 United Kingdom .
1538157 1/1979 United Kingdom .
1543715 4/1979 United Kingdom .
1543910 4/1979 United Kingdom .
201725A 10/1979 United Kingdom .
1555606 11/1979 United Kingdom .

Primary Examiner—Donald J. Yusko
Attorney, Agent, or Firm—Cushman, Darby & Cushman

[57] ABSTRACT

An active transponder device comprises a CMOS integrated circuit including means for receiving an input signal including coded information, a memory for storing said information, and transmitter means for transmitting an output signal including said information, the input signal and the output signal being both low frequency induction communication signals.

Normally, the output signal is emitted in response to an interrogation signal received via the receiving means, and is formed by modulation of that signal with said information after readout from the memory. The transponder operates inherently synchronously, using a single master clock signal which is generated either in an interrogation transmitter or in the programmer for injecting the coded information.

The integrated circuit has a second receiving means used in the injection of the coded information. The injection of a clock-pulse which is in synchronism with the input signal enables the memory to receive the coded information.

The transponder may be used for the identification of e.g. people or articles at the limits of a particular area e.g. a store.

9 Claims, 2 Drawing Figures

CODED INFORMATION ARRANGEMENT

BACKGROUND OF THE INVENTION

The present invention relates to an arrangement for detecting coded information and more particularly to an arrangement in which the code is held on an active transponder. Such arrangements are useful in the identification of articles, or to control the entry of personnel to zones of limited access, for example.

One such arrangement is shown in FIG. 6 of Patent Application GB No. 2017454A. A circuit is provided with an encoder in the form of a data coding chip. The chip comprises a plurality of diodes, selected ones of which are blown to permit a unique serially coded pulse train to be produced. A disadvantage of this previous arrangement is that once the code has been selected it cannot be readily changed. However, the use of a chip containing all relevant circuitry is a very economical way of manufacturing a transponder in large numbers. It would be a considerable advantage if such a transponder could be produced in which the coding could be changed at will.

British patent specification No. 1 555 606, supported by its Parent Patent No. 1 538 157, describes a transponder in which a unique code is stored in a memory and can be changed. However, this system is on a very different scale since the transponder is to be mounted on vehicles, its weight is not critical, and its manufacture would be extremely expensive. It operates exclusively using high frequency electromagnetic signals (10 GHz) and waveguides. Such a device requires relatively high current levels for its operation, and therefore requires a larger battery or more frequent changes.

SUMMARY OF THE INVENTION

The invention aims to provide a cheap, lightweight massproduced transponder of low current consumption.

According to one aspect of the invention, there is proposed an active transponder device comprising a semiconductor integrated circuit including means for receiving an input signal including coded information, a memory for storing said information, and transmitter means for transmitting an output signal including said information, the input signal and the output signal being both low frequency induction communication signals.

The use of the low-frequency induction communication band (up to 150 KHz) enables the use of CMOS chips which have very low quiescent current consumption.

Normally, the output signal is emitted in response to an interrogation signal received via the receiving means, and is formed by modulation of that signal with said information after readout from the memory. The transponder operates inherently synchronously, using a single master clock which is generated either in an interrogation transmitter or in the programmer for injecting the coded information. This ensures very high integrity operation and requires only minimal verification to ensure valid signals.

Preferably, the integrated circuit has a second receiving means used in the injection of the coded information. The use of this second receiving means for injection of a clockpulse which is in synchronism with the input signal enables a very high level of program protection to be achieved before the memory is enabled to receive the coded information. Moreover, the dual signal input allows the use of a simple, cheap integrated circuit.

In accordance with a second aspect of the invention, there is provided a detector system comprising means for emitting a low-frequency induction communication signal, an active transponder device, responsive to such input signal, having a memory for storing coded information and transmitter means for producing an output signal formed by modulation of the input signal with the coded information, and means for receiving the transponder output signal.

BRIEF DESCRIPTION OF THE DRAWINGS

A preferred embodiment of the present invention will now be described by way of example only, with reference to the accompanying drawings, of which.

DESCRIPTION OF THE PREFERRED EMBODIMENT

Figure 1:
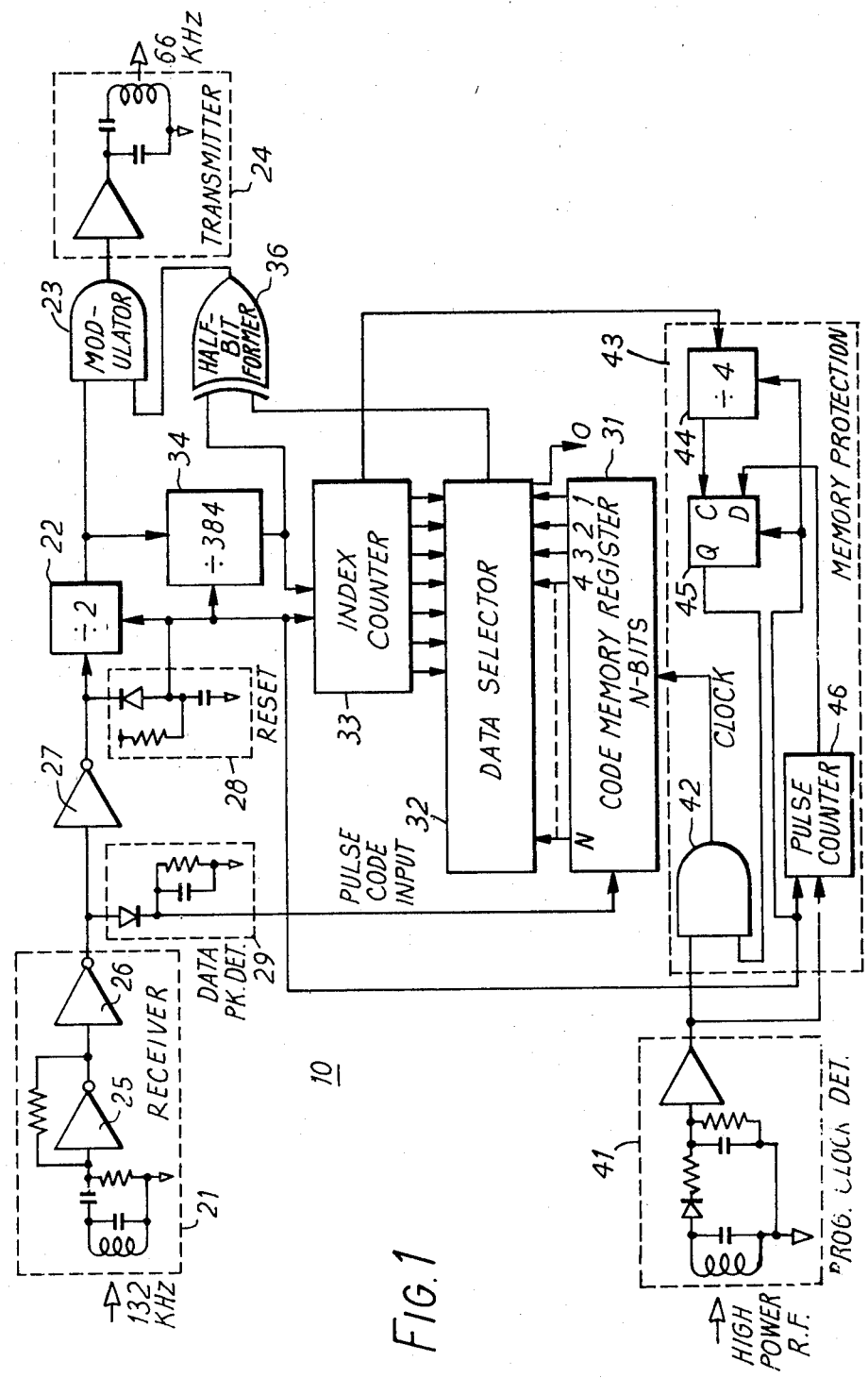
FIG. 1 shows a block diagram of a programmable coded tag constituting an active transponder.

Referring to FIG. 1 there is shown in block diagram from the circuitry of an active transponder 10 which is mounted on a programmable tag 20. The circuitry is a semiconductor integrated circuit of CMOS type, designed for operation in the inducted frequency communication bond i.e. up to 150 KHz. The transponder emits a phase coherent response at a sub-harmonic of an interrogating transmission; such a transponder is disclosed in Patent Application GB No. 2017454 A.

A receiver 21 comprises a self-biasing input stage, used as an RF amplifier for the interrogation signal which is transmitted at a frequency of 132 KHz and two inverters, 25, 26. The detected interrogation signal is fed via a further inverter 27 to a frequency translator 22 which divides the signal by a factor of two to provide a 66 KHz re-transmission carrier.

The output of receiver 21 is also supplied to a detector circuit 29, and the output of inverter 27 is also supplied to a counter reset circuit 28. The 66 KHz carrier signal from frequency translator 22 is fed to a modulator 23 comprising an AND gate where the carrier is modulated by the code data word. The 66 KHz carrier signal is also supplied to a divide-by-384 counter 34.

The modulated signal is then supplied to a transmitter 24 which comprises a buffer amplifier supplying a re-transmit aerial with a power boosted signal.

The encoding circuitry of the programmable tag comprises a code data memory register 31 which stores the programmed code data. A memory addressing circuit comprises an N-Bit data selector 32. The memory data digit output of which is determined by an indexing counter 33. Counter 33 receives clock pulses from the counter 34. An output data formatting circuit is constituted by a half-bit forming circuit 36 which is an exclusive—OR gate; a selected data digit is combined with the output of the clock counter 34 to form a half-bit data transmission format. Thus data 'zero' is transmitted at '0' for half the time followed by '1' for the remaining half, with complementary transmissions for data 'one'.

For use in programming the tag 20, a second R.F. receiver 41 is provided. The output of receiver 41 is fed via an AND gate 42 to the clock input of code memory register 31. AND gate 42 is part of an inhibiting circuit 43 serving to protect the memory by preventing accidental clocking of the code memory register. The inhibiting circuit 43 also comprises a divide-by-4 counter 44, a D-type flip-flop and a pulse counter 46.

Figure 2:
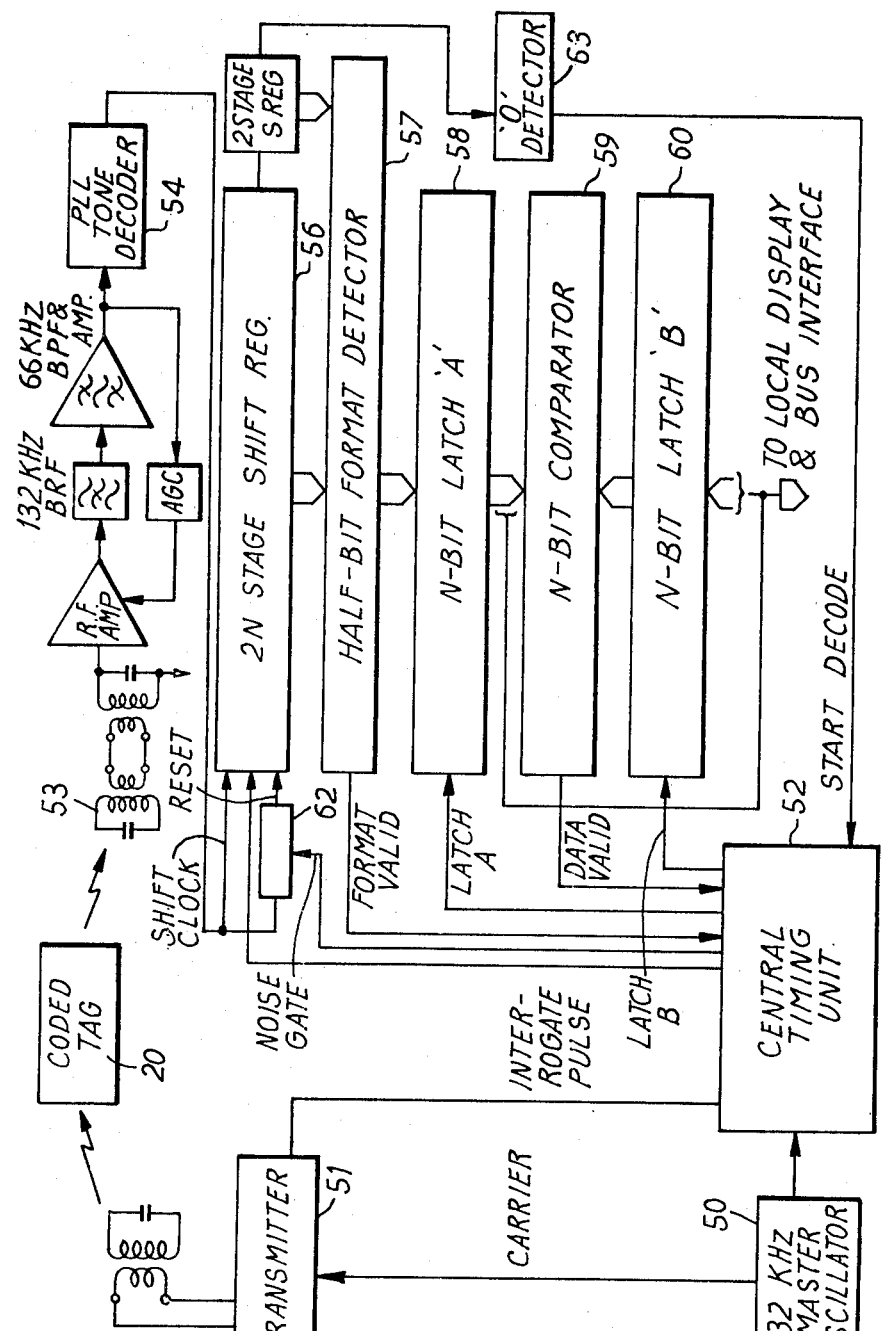
FIG. 2 shows a block diagram of an interrogator associated with the coded tag of FIG. 1.

Referring now to FIG. 2, there is shown an interrogator for use with the coded tag 20. A master 132 KHz oscillator 50 feeds both the transmitter 51 and a system central timing unit 52. A 66 KHz signal emitted by the active transponder 10 on tag 20 is detected by a receiver 53. The output of a receiver tone decoder 54 is fed into a (2N+2) stage shift register 56 under the control of the central timing unit 52. A half-bit format detector 57 checks the half-bit format and an N-Bit latch 58 acts as a temporary store for the data. The data is subsequently transferred to a second N-bit latch 60 whose contents are compared with latch 58 by a conparator 59. A noise gate 62 is also provided to permit unwanted noisy signals to be rejected. A 'zero' detector 63 is connected to shift register 56.

The normal mode of operation of the arrangement will now be described. Assuming initially that the tag 20 is remote from a sensitive zone and that is there is no 132 KHz signal present at its input, then the output of inverter 25 is high (a logic '1') and the output of inverter 26 is low (a logic '0'). Thus the code data input supplied by detector circuit 29 to the code memory register 31 is also low. The output of inverter 27 is high, causing a reset signal to be applied to all of the counters and other sequential logic functions establishing a known initial state.

When the tag is introduced into a sensitive zone, it receives a 132 KHz continuous signal and the reset signal is removed, thus enabling all the counters. Frequency translator or divider 22 then supplies a 66 KHz carrier supply signal to the modulator 23 and to counter 34 to provide a clock pulse for indexing counter 33 and the half-bit forming circuit 36. The indexing counter is thus advanced from zero at a pulse repetition interval of 5.82 milliseconds. A data output of zero is required initially such that the data input to the modulator 23 is low for 2.91 milliseconds and high for the next 2.91 milliseconds in half-bit format. This technique prevents the coded tag responding to a transmission from a presence sensing tag system which transmits 132 KHz for 2.0 milliseconds at 35 millisecond intervals. Such a system is disclosed in the above-mentioned patent application GB No. 2017454A. The indexing counter 33 is advanced one count at the end of the initial 5.82 milliseconds causing the first code data digit stored in the memory register 31 to be output in half-bit format. This sequence repeats until all code data digits been addressed and output in half-bit format, after which time the 132 KHz interrogation transmitter 51 is switched off for a period of some 20 to 50 milliseconds in order to permit auto-resetting to occur in readiness for the next interrogation. In this way a coded tag transmits a 66 KHz signal amplitude modulated by its unique code and incorporating a leading zero. The total time between interrogation cycles is therefore Nx 5.8+35±15 milliseconds, e.g. 175±15 milliseconds for a 24-Bit code.

A leading one or zero may be permanently programmed during manufacture of the tag by strapping of the first memory location (0 in FIG. 1). This will allow the tag to respond if required to the presence sensing system mentioned above.

During each interrogation cycle the central timing unit 52 gates the 132 KHz carrier 'on' for a period equal to (N+1)×5.82 milliseconds, where N is the number of code Bits. A serial digital Bit stream corresponding to the coded response signal transmitted by the active transponder 10 of the tag is fed into the (2N+2) stage shift register 56 under the control of timing unit 52. Upon completion of the (2N+2) clock pulse cycle, the code format is checked for the correct half-bit format and if valid the data is dumped into a temporary store consisting of the first N Bit Latch 58.

The decoding process is enabled upon satisfactory detection of the leading zero by detector 63.

The data received from the next interrogation response is pushed into the first latch 58 once the original data has been transferred to the second latch 60. The results of two successive interrogation are compared at 59 and if a match is obtained the data is deemed valid and is then produced as an output for display alarm or further processing.

As many comparisons as requied may be carried out. For example further comparators and latches may be provided, or a plurality of "data valid" signals may be counted before the central timing unit is actuated to produce an output.

Whilst the received signal is being fed to shift register 56, it is also tested for noise transistions around the clocking instant by noise gate 62. If a '1' to '0' transition is detected during what should be a '1' signal, it is assumed that this is due to undesired noise and the data already received is destroyed by re-setting shift register 56. Thus instead of performing a whole transmission cycle, the cycle is terminated and a new cycle is commenced; this leads to a saving of time.

The programming mode of operation of the arrangement will now be described in which a desired code is applied to the tag 20. In this mode, the code data is transmitted to the 132 KHz receiver 21 and an inductively coupled r.f. code memory clock signal is applied to receiver 41. This avoids the need to radiate r.f. transmissions which in some countries requires a licence. Also the high input signal level required to internally generate a clock pulse gives added noise immunity to the system. The receiver outputs are detected and fed respectively to the data and clock inputs of the coded memory register 31. Once the inhibiting circuit 43 is enabled to pass the clock signals, the memory is programmed by the coded data stream signal. A normal interrogation cycle is then carried out to validate the code.

The clock input of register 31 is inhibited for a period corresponding to at least two interrogation transmission times by the counter 44. The AND gate 42 is inhibited until the output of the D-type Flip Flop 45 goes high which can only occur when the correct whole number of pulses has been received at the programme clock receiver 41 as determined by the pulse counter 46 and while simultaneously a number of 132 KHz pulse corresponding to twice the total count of the indexing counter 33 has been received. The code programming cycle is thus longer than the normal interrogation cycle.

An advantage of the above arrangement is that a user can easily reprogram the coded data. This is of particular advantage where such data is required for a short time only or where the data contains some element which needs to be updated periodically. Examples of such uses are automatic baggage handling, mail bag routing container identification. The data may relate inter alia to size, weight, destination, data, time, price or other classification, as well as including unique identification. A further advantage is that the reprogramming may be effected without making any physical electrical contact with or disturbing the tag in any way. In addition the tag only needs to be taken out of service for a very short time at the user's convenience.

There is no limit to the number of reprogramming cycles which may be undertaken during the service life of the transponder. The number of possible codes is also very large indeed, the only limit being imposed by the size of the chip used. Billions of unique coxed may be utilised.

Due to the small physical size requirement of both the transponder and interrogator, the roles are interchangeable i.e. the interrogator may be static and used to detect the presence of a transponder in the sensitive zone or alternatively, the transponders may be fixed to large objects and a portable interrogator used to "read" the codes for contents identification, etc.

Various further modifications may be made to the above arrangement. For example the active transponder could be mounted directly on or could be an integral part of any article which it is desired to detect.

In an alternative modification, the transponder may be replaced by a 'free-running' device, which operates continuously without the need for an interrogation signal. The signal transmitted by the device contains coded information which may be changed from time to time as desired.

The device may be designed to operate anywhere in the induction communication frequency band.

It will be understood that the above description of the present invention is susceptible to various modification changes and adaptations.

We claim:

1. An active transponder device comprising first signal receiving means for receiving an input signal including coded information, a memory for storing said information, transmitter means for transmitting an output signal including said information, second signal receiving means and a program protection circuit, said program protection circuit being connected to receive signals from said first and second signal receiving means and being further connected to said memory, and said program protection circuit comprising means responsive to a predetermined time relationship between respective signals received from said first and second signal receiving means to enable the memory for storage of said coded information.

2. A transponder device as claimed in claim 1 wherein said first signal receiving means also receives an interrogation signal and wherein said transmitter means include a modulator, said modulator forming said output signal by modulation of said interrogation signal with said information.

3. A transponder device as claimed in claim 2 wherein said modulator comprises an exclusive—OR gate fed with data at one input and a carrier pulse at the other, the pulse rate being twice the data rate so as to produce a half-bit data transmission format.

4. A transponder device as claimed in claim 1, the input signal and the output signal being both low-frequency induction communication signals.

5. A transponder device as claimed in claim 4 wherein the signal from said second receiving means is a radio-frequency signal, at a pulse repetition rate related to that of the first signal, and said predetermined time relationship requires an exact whole number count accumulation within a period determined by the first signal.

6. A transponder device as claimed in claim 5 wherein said second receiving means is adapted to receive said radio-frequency signal by inductive coupling of a closely adjacent emitter of a programming device.

7. A transponder device as claimed in claim 1 wherein said memory has a plurality of store locations and a specified one of said locations does not receive said coded information, and provides, as desired, a 'one' or a 'zero' in said specified location independent of said information.

8. A transponder device as claimed in claim 1 including a discriminator circuit which detects any asynchronous signal changes representing noise, causes immediate termination of the function then in progress, and initiates a re-start of that function.

9. An active transponder device comprising first signal receiving means for receiving an input signal including coded information, a memory for storing said information, transmitter means for transmitting an output signal including said information, second signal receiving means and a program protection circuit, said program protection circuit comprising gate means having first and second inputs and an output, a first pulse counting means, a second pulse counting means and a logic circuit having first and second inputs and an output, said first input of the gate means and the input of said first pulse counting means being connected to receive signals from said second signal receiving means, the input of said second pulse counting means being connected to receive pulses derived from said first signal receiving means, the output of said second pulse counting means being connected to said first input of said logic circuit, the output of said first pulse counting means being connected to said second input of said logic circuit, said logic circuit being connected to said second input of the gate means to provide a signal thereto in response to a predetermined time relationship between respective signals received from said first and second signal receiving means, said output of said gate means constituting the output of said program protection circuit and being connected to said memory to enable the memory, in response to receipt of a said signal from said logic circuit, for storage of said coded information.

* * * * *